A. WILSON.
REEL.
APPLICATION FILED FEB. 27, 1909.
932,218.
Patented Aug. 24, 1909.
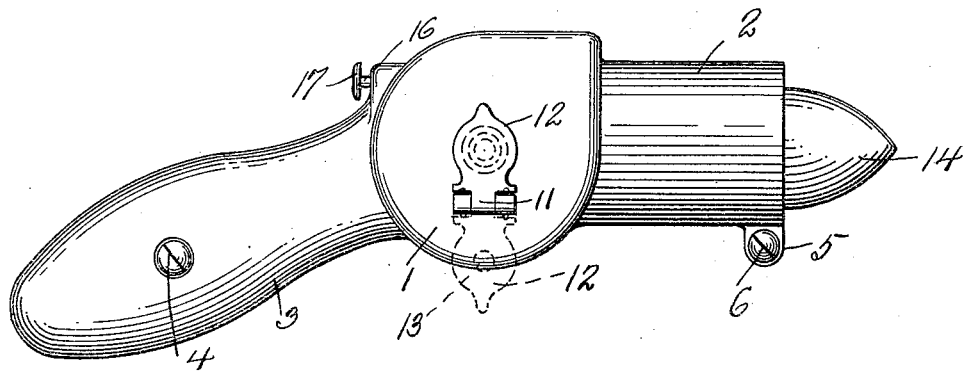
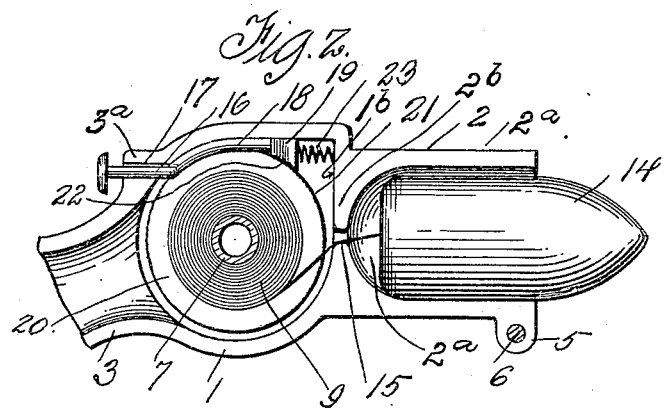
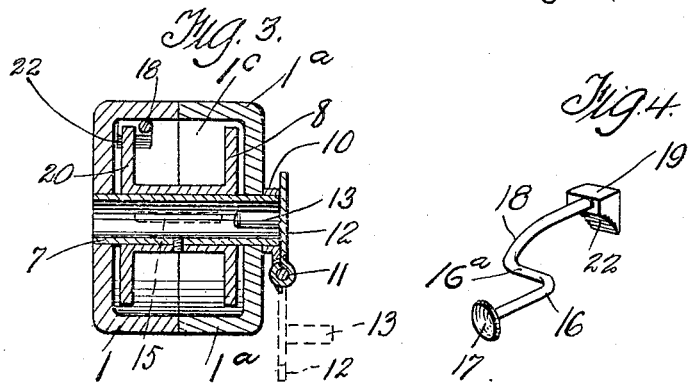
Inventor
A. Wilson.
Witnesses
Samuel Payne.
R. H. Butler.
By H. C. Everitt
Attorneys.

UNITED STATES PATENT OFFICE.

AUGUST WILSON, OF WILSON, PENNSYLVANIA.

REEL.

932,218.  Specification of Letters Patent.  Patented Aug. 24, 1909.

Application filed February 27, 1909. Serial No. 480,320.

*To all whom it may concern:*

Be it known that I, AUGUST WILSON, a subject of the King of Sweden, residing at Wilson, in the county of Allegheny and State of Pennsylvania, have invented certain new and useful Improvements in Reels, of which the following is a specification, reference being had therein to the accompanying drawing.
This invention relates to plumb-bobs and is particularly designed for determining vertical planes and also depths and one of the objects thereof is to provide a plumb-bob in the manner as hereinafter set forth with a casing for housing and protecting the line when not in use.

Further objects of the invention is to provide a plumb-bob with means in a manner as hereinafter set forth for controlling the paying out of the line and for rewinding the line when occasion so requires; and a further object is to provide the plumb-bob in a manner as hereinafter set forth with a support for the plumb-bob body or weight.
Further objects of the invention is to provide a plumb-bob which shall be simple in its construction, durable, efficient in its use, conveniently carried and handled by stone masons, brick layers, and seamen, and comparatively inexpensive to manufacture.

With the foregoing and other objects in view, the invention consists in the novel construction, combination and arrangement of parts hereinafter more specifically described and illustrated in the accompanying drawings, wherein is shown the preferred embodiment of the invention, but it is to be understood that changes, variations and modifications can be resorted to which come within the scope of the claims hereunto appended.

In the drawings wherein like reference characters denote corresponding parts throughout the several views, Figure 1 is a side elevation of a plumb-bob in accordance with this invention, Fig. 2 is a longitudinal sectional view thereof with one end broken away, Fig. 3 is a cross sectional view through the spool, and Fig. 4 is a detail showing in perspective the brake shoe and the operating bar therefor.

Referring to the drawings in detail, 1 and $1^a$ denote the sections of a casing, each section being made of strong and durable material to fully withstand the rough usage to which the plumb-bob is subjected and each of said sections are similar in construction and comprise a cup-shaped body portion, the said body portions when arranged against each other provide a spool chamber $1^c$. Projecting from one end of each of the cup-shaped portions within a semi-cylindrical extension 2, said extensions 2 of the sections of the casings are secured together to form a weight housing $2^a$. The wall $2^b$ from which the extension 2 projects is provided with a line passage 15. Each of the cup-shaped portions at its other end terminates in a rearward inclined extension 3, cylindrical in cross section and the said extensions 3 when the sections of the casing are secured together constitutes a handle for the operator. The sections 3 are secured together by the hold-fast device 4 and each of the extensions 2 is formed with a depending lug 5 through which extends the hold-fast device 6 whereby the extensions 2 are secured. Each of the sections 3 at its top where it merges in the cup-shaped body portion is offset as at $3^a$ and provided with a passage 17 the function of which will be hereinafter referred to. Journaled transversely and approximately centrally of the cup-shaped body portions of the sections 1 and $1^a$ is a sleeve 7 and mounted upon said sleeve within the chamber $1^c$ is a spool 8, which receives the line 9. One end of the sleeve 7 projects from the section 1 and is formed with a collar 10 having hinged thereto as at 11 a handle 12 formed with a crank 13. When the handle 12 is not used, is adapted to be swung upwardly into engagement with the collar 10 and with the crank 13 extending into the sleeve 7. The sleeve 7 is mounted for rotation in the sections 1 and $1^a$ of the casing, and the spool 8 is fixed to the sleeve 7. The line 9 has one end attached to the spool 8, is wound upon said spool and extends through the passage 15, and is attached to the weight 14 which when the plumb-bob is not used is arranged in the chamber $2^a$.

The plumb-bob comprises a brake device to arrest movement of the spool 8 so as to prevent unwinding of the line 9 until the brake device is shifted clear of the spool. The brake device comprises means for normally maintaining it in engagement with the spool. Said brake device consists of a brake shoe operating bar comprising an outer portion 16, inner portion 18, and an intermediate connecting portion $16^a$, the latter is angularly-disposed with respect to the portions 16 and 18 whereby a substantially zigzag-shaped brake shoe actuating bar is provided. The portion 16 extends through the passage 17, the latter being centrally-disposed with respect to the casing. The portion 16ª extends transversely with respect to the chamber 1ᶜ whereby the portion 18 is arranged at one side of the said casing 1ᵘ. The portion 18 is slightly curved so as to be positioned in proximity to the inner face of the top of the cup-shaped body portion of the section 1ª. The section 16 projects from the offset portion 3ª and has upon its projecting end a button 17ª to facilitate the operation of the bar when occasion so requires. The free end of the portion 18 is provided with a brake shoe 19 for engaging one of the heads of the spool 8. The shoe 19 is beveled as at 22, the said beveled portion being knurled or serrated for engagement with the roughened periphery of the head 20 of the spool 8. The brake shoe 19 is normally maintained in engagement with the head 20 by a spring 23 which is located in the chamber 1ᶜ and interposed between the shoe 19 and the inner face of the wall 1ᵇ.

When it is desired to pay out the line 9, pressure is applied to the button 17ª of the brake bar, which forces the brake shoe 19 from engagement from the head 20 of the spool 8, the spool 8 is then released and the weight 19 is adapted to unwind the line from the spool. To rewind the line, the handle 12ª is swung outwardly to the position shown in dotted lines of Fig. 3 and the crank 13 gripped, whereby the sleeve 7 can be rotated which carries the spool 8 therewith causing a rewinding of the line. During this operation pressure is applied upon the button 17ª so as to shift the brake shoe operating bar inwardly and to release the shoe 19 from engagement with the head 20 of the spool 8.

The handle 3 permits of the plumb-bob being easily held while the line is being payed out or unwound, and furthermore the construction of the plumb-bob in its entirety provides a device of such class which can be conveniently handled and easily carried.

Having now described my invention what I claim as new, is:—

1. A plumb-bob comprising a casing formed of two sections detachably connected together and embodying a weight housing a spool chamber and a handle, a sleeve journaled in the sections of said casing, a spool mounted upon said sleeve, a collar carried by said sleeve at one side of said casing, a handle hinged to said collar, a crank carried by said handle and adapted to extend into said sleeve when said handle is closed, a line attached to and wound upon said spool and having one end thereof extending into said housing, a weight carried by the end of said line within said housing, a brake lever extending into said casing, a shoe carried by said brake lever for engaging said spool, and a spring arranged within said casing for normally holding said shoe in engagement with said spool.

2. A plumb-bob comprising a casing embodying a weight housing at one end a handle at the other end and a spool chamber intermediate the housing and handle, a spool arranged in the spool chamber and rotatably connected to said casing, said casing provided with means for establishing communication between the spool chamber and the weight housing, a line attached to and wound upon said spool and having one end thereof extending into said housing, a weight arranged in said housing and connected to said line, and means arranged exteriorly of the spool chamber and connected with said spool for rotating it.

3. A plumb-bob comprising a casing embodying a weight housing at one end a handle at the other end and a spool chamber intermediate the housing and the handle, a spool arranged in the spool chamber and rotatably connected to said casing, said casing provided with means for establishing communication between the spool chamber and the weight housing, a line attached to and wound upon said spool and having one end thereof extending into said housing, a weight arranged in said housing and connected to said line, means arranged exteriorly of the spool chamber and connected with said spool for rotating it, and means arranged at the top of said spool chamber and engaging the spool for retarding the operation thereof.

4. A plumb-bob comprising a casing embodying a weight housing at one end thereof a handle at the other end thereof and a spool chamber intermediate the housing and the handle, a spool arranged in the spool chamber and rotatably-connected to said casing, said casing provided with means for establishing communication between the spool chamber and the weight housing, a line attached to and wound upon said spool and having one end thereof extending into said housing, a weight arranged in said housing and connected to said line, and means arranged exteriorly of the spool chamber and connected with said spool for rotating it, a spring pressed brake shoe arranged within said chamber at the top thereof and above the spool and normally engaging one head of the spool to retard the operation of the latter, and a substantially zigzag-shaped bar extending in said chamber from the inner end of the handle and connected to said brake shoe and adapted when shifted to release the brake shoe clear of the spool.

5. A plumb-bob comprising a casing embodying a handle, a spool chamber and a weight housing communicating with the spool chamber, said spool chamber interposed between said handle and said housing a weight mounted in said housing, a rotatable spool arranged within said chamber, a line connected to the spool and to the weight and adapted to wind or unwind from said spool, means arranged exteriorly of the spool chamber and connected with the spool for rotating the latter, means arranged in the spool chamber for retarding the operation of the spool, and means arranged in the spool chamber and projecting therefrom at the inner terminus of the handle and adapted when operated in one direction to release said retarding means.

In testimony whereof I affix my signature in the presence of two witnesses:

AUGUST WILSON.

Witnesses:
 JOHN LARSON,
 MAX H. SROLOVITZ.